(12) United States Patent
Takagaki et al.

(10) Patent No.: US 12,333,226 B2
(45) Date of Patent: Jun. 17, 2025

(54) METHOD OF DESIGNING COMPOSITE MATERIAL LAMINATED STRUCTURE, METHOD OF MANUFACTURING COMPOSITE MATERIAL LAMINATED STRUCTURE, DESIGNING DEVICE FOR COMPOSITE MATERIAL LAMINATED STRUCTURE

(71) Applicant: Mitsubishi Electric Corporation, Tokyo (JP)

(72) Inventors: Kazunori Takagaki, Tokyo (JP); Kazushi Sekine, Tokyo (JP); Sohei Samejima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 904 days.

(21) Appl. No.: 17/437,422

(22) PCT Filed: Apr. 22, 2019

(86) PCT No.: PCT/JP2019/017065
§ 371 (c)(1),
(2) Date: Sep. 9, 2021

(87) PCT Pub. No.: WO2020/217281
PCT Pub. Date: Oct. 29, 2020

(65) Prior Publication Data
US 2022/0156439 A1 May 19, 2022

(51) Int. Cl.
*G06F 30/27* (2020.01)
*B29C 70/30* (2006.01)
(Continued)

(52) U.S. Cl.
CPC ............. *G06F 30/27* (2020.01); *B29C 70/30* (2013.01); *G06F 2113/26* (2020.01); *G06F 2119/18* (2020.01)

(58) Field of Classification Search
CPC ...... G06F 30/00; G06F 30/27; G06F 2113/26; G06F 2119/18; G06F 2113/24;
(Continued)

(56) References Cited

U.S. PATENT DOCUMENTS

2015/0170022 A1* 6/2015 Malik ..................... G06F 30/23
706/21
2017/0371980 A1* 12/2017 Mallapragada ....... B29C 66/967

FOREIGN PATENT DOCUMENTS

CN     101533483 A    9/2009
JP       7-92396 A    4/1995
(Continued)

OTHER PUBLICATIONS

Extended European search report issued on Mar. 29, 2022, in corresponding European patent Application No. 19926299.9, 13 pages.
(Continued)

*Primary Examiner* — Cedric Johnson
(74) *Attorney, Agent, or Firm* — XSENSUS LLP (57) ABSTRACT

Provided is a method of designing a composite material laminated structure, the method including: a machine learning step of performing machine learning on a plurality of pieces of data each of which includes a pair of a physical property value of the composite material laminated structure and a laminate configuration of the composite material laminated structure, to obtain a relational expression depicting a relationship between the physical property value and the laminate configuration, the composite material laminated structure including a plurality of layers that are laminated; and a laminate configuration information calculation step of calculating, based on the relational expression and an objective value of the physical property value, laminate configu-
(Continued)

ration information which is information of the laminate configuration that enables the objective value to be obtained.

11 Claims, 7 Drawing Sheets

(51) Int. Cl.
  *G06F 113/26* (2020.01)
  *G06F 119/18* (2020.01)

(58) Field of Classification Search
  CPC ....... B29C 70/30; B29C 70/228; B32B 37/14; B32B 2250/20; B32B 5/12; B32B 2260/023; B32B 2260/046; B32B 2305/70; B32B 2307/30; B32B 2307/54; B32B 2551/08
  USPC .......................................................... 703/1
  See application file for complete search history.

(56) References Cited

FOREIGN PATENT DOCUMENTS

| JP | 9-160940 A | 6/1997 |
| JP | 2002-18941 A | 1/2002 |
| JP | 2018-156689 A | 10/2018 |

OTHER PUBLICATIONS

Haichao An et al., "Multi-objective optimization of a composite stiffened panel for hybrid design of stiffener layout and laminate stacking sequence", Structural and Multidisciplinary Optimization, 2018, vol. 57, pp. 1411-1426, https://doi.org/10.1007/s00158-018-1918-2.

S.H. Hesse et al., "A method to reduce design complexity of automotive composite structures with respect to crashworthiness", Composite Structures, vol. 129, 2015, pp. 236-249.

International Search Report and Written Opinion mailed on Jul. 16, 2019, received for PCT Application PCT/JP2019/017065, Filed on Apr. 22, 2019, 11 pages including English Translation.

\* cited by examiner

METHOD OF DESIGNING COMPOSITE MATERIAL LAMINATED STRUCTURE, METHOD OF MANUFACTURING COMPOSITE MATERIAL LAMINATED STRUCTURE, DESIGNING DEVICE FOR COMPOSITE MATERIAL LAMINATED STRUCTURE

CROSS-REFERENCE TO RELATED APPLICATION

The present application is based on PCT filing PCT/JP2019/017065, filed Apr. 22, 2019, the entire contents of which are incorporated herein by reference.

TECHNICAL FIELD

The present invention relates to a method of designing a composite material laminated structure in which a plurality of layers are laminated, a method of manufacturing a composite material laminated structure, and a designing device for a composite material laminated structure.

BACKGROUND ART

An optical observation satellite is desired to be capable of photographing a high resolution image having excellent discernibility and stable image quality. It is therefore demanded of the optical observation satellite to be capable of maintaining stable optical observation performance in orbit for a long period of time. Realization of such an optical observation satellite requires a large-sized mirror and a support structure configured to support the mirror that has high rigidity and high stableness in terms of dimensions.

As one of support structures having high rigidity and high stableness in terms of dimensions, a pipe made of fiber-reinforced plastic (FRP) is known. However, the manufacture of an FRP pipe having a desired physical property value requires arduous designing with regards to a laminate configuration of the FRP pipe.

In Patent Literature 1, there is described a design assistance method that provides assistance in designing an FRP pipe. In this design assistance method, objective values for thickness, bending rigidity, and torsional rigidity in any place in a cross-section of an FRP pipe, allowable values of the objective values, and an outer diameter of a mandrel are input to a computer, and a type of a sheet-like member and a fiber orientation angle of the sheet-like member are further specified. This causes the computer to display a laminate configuration of the sheet-like member, a pipe thickness, a pipe bending rigidity, and a pipe torsional rigidity that satisfy the objective values including the allowable values.

CITATION LIST

Patent Literature

[PTL 1] JP 2002-18941 A

SUMMARY OF INVENTION

Technical Problem

With the design assistance method of Patent Literature 1, a relational expression depicting a relationship between demanded specifications of the FRP pipe and a laminate configuration and others of the sheet-like member is required to be input to the computer in advance. However, there may not be a general form of the relational expression described above. A resultant problem is that designing of the laminate configuration of a composite material laminated structure is still arduous despite the use of the design assistance method of Patent Literature 1.

The present invention has been made to solve the problem described above, and an object thereof is to provide a method of designing a composite material laminated structure, a method of manufacturing a composite material laminated structure, and a designing device for a composite material laminated structure with which arduousness of designing a laminate configuration of a composite material laminated structure can be reduced.

Solution to Problem

According to one embodiment of the present invention, there is provided a method of designing a composite material laminated structure, the method including: a machine learning step of performing machine learning on a plurality of pieces of data each of which includes a pair of a physical property value of the composite material laminated structure and a laminate configuration of the composite material laminated structure, to obtain a relational expression depicting a relationship between the physical property value and the laminate configuration, the composite material laminated structure including a plurality of layers that are laminated; and a laminate configuration information calculation step of calculating, based on the relational expression and an objective value of the physical property value, laminate configuration information which is information of the laminate configuration that enables the objective value to be obtained.

According to one embodiment of the present invention, there is provided a method of manufacturing a composite material laminated structure that includes the method of designing a composite material laminated structure of one embodiment of the present invention, the method of manufacturing a composite material laminated structure further including: a material laminating step of laminating an intermediate material based on the laminate configuration information; and a shape forming step of forming a shape of the composite material laminated structure by integrating the intermediate material.

According to one embodiment of the present invention, there is provided a designing device for a composite material laminated structure, the designing device including: a machine learning unit configured to perform machine learning on a plurality of pieces of data each of which includes a pair of a physical property value of the composite material laminated structure and a laminate configuration of the composite material laminated structure, to obtain a relational expression depicting a relationship between the physical property value and the laminate configuration, the composite material laminated structure including a plurality of layers that are laminated; and a laminate configuration information calculation unit configured to calculate, based on the relational expression and an objective value of the physical property value, laminate configuration information which is information of the laminate configuration that enables the objective value to be obtained.

Advantageous Effects of Invention

According to the present invention, the arduousness of designing the laminate configuration of the composite material laminated structure can be reduced.

DESCRIPTION OF EMBODIMENTS

First Embodiment

A method of designing a composite material laminated structure according to a first embodiment of the present invention is described. The composite material laminated structure is a structure formed from a composite material in which a plurality of layers are laminated. The composite material laminated structure is usable for, for example, a support structure configured to support a large-sized mirror in an optical observation satellite. In this embodiment, FRP is used as the composite material. Each of the plurality of layers included in the composite material laminated structure includes fiber oriented at a specific fiber orientation angle.

Figure 1:
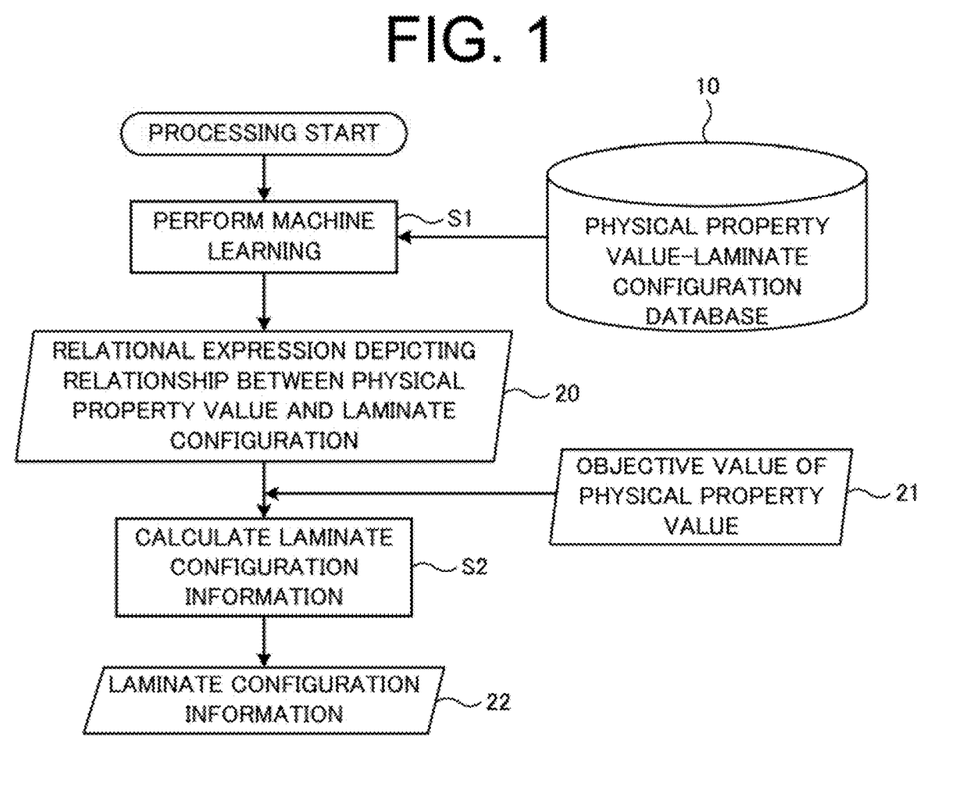
FIG. 1 is a flow chart for illustrating a flow of processing of a method of designing a composite material laminated structure according to a first embodiment of the present invention.

FIG. 1 is a flow chart for illustrating a flow of processing of the method of designing a composite material laminated structure according to this embodiment. The processing illustrated in FIG. 1 is performed by executing, on a computer that includes a processor, a storage device, an input/output interface circuit, and others, a program stored in the storage device by the processor.

As illustrated in FIG. 1, the method of designing a composite material laminated structure according to this embodiment includes a machine learning step (Step S1) and a laminate configuration information calculation step (Step S2). When the method of designing a composite material laminated structure according to this embodiment is executed, a physical property value-laminate configuration database 10 is used. A plurality of pieces of data are stored in the physical property value-laminate configuration database 10. Each of the plurality of pieces of data includes a combination of a physical property value of the composite material laminated structure and a laminate configuration of the composite material laminated structure.

In the machine learning step of Step S1, machine learning is performed on the data stored in the physical property value-laminate configuration database 10. This yields a relational expression 20 depicting a relationship between a physical property value of the composite material laminated structure and a laminate configuration of the composite material laminated structure. The relational expression 20 outputs a laminate configuration in response to input of a physical property value. A physical property value and a laminate configuration that are pieces of data forming a pair in the physical property value-laminate configuration database 10 can each have a plurality of elements. A longitudinal elastic modulus, a transverse elastic modulus, a Poisson ratio, and a thermal expansion rate are given as an example of elements of the physical property value. The number of layers required to be laminated that is set for each fiber orientation angle is given as an example of elements of the laminate configuration. An operator of the computer can specify elements of the physical property value and elements of the laminate configuration as required.

In the laminate configuration information calculation step of Step S2, an objective value 21 of the physical property value which is input by the operator is input to the relational expression 20 obtained in the machine learning step. Laminate configuration information 22 is thus calculated. The laminate configuration information 22 is information of a theoretical laminate configuration with which the objective value 21 is reached in the composite material laminated structure. The objective value 21 of the physical property value is set based on required specifications of the composite material laminated structure.

Figure 2:
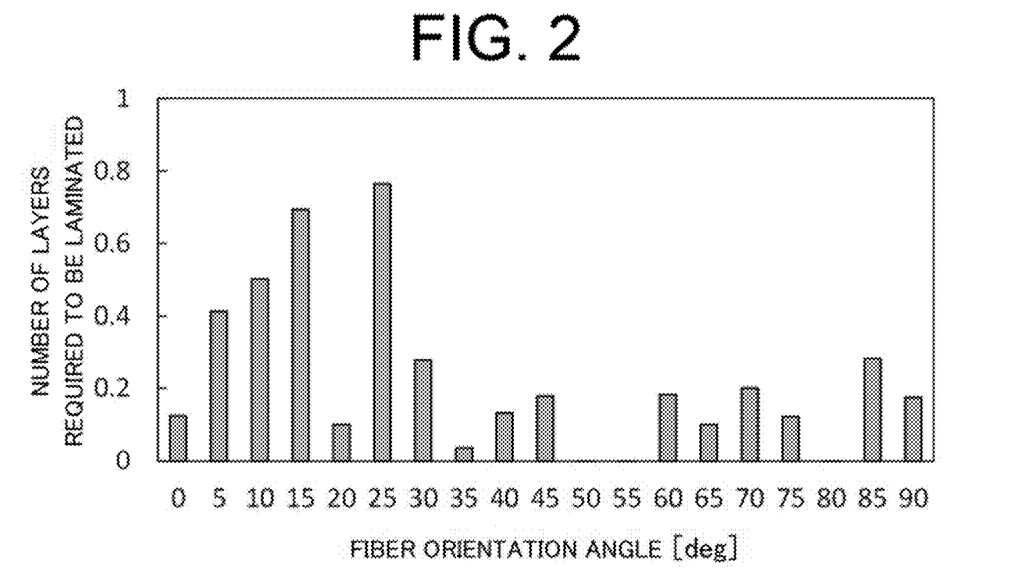
FIG. 2 is a diagram for illustrating, in the form of a graph, an example of laminate configuration information to be calculated in a laminate configuration information calculation step of the method of designing a composite material laminated structure according to the first embodiment of the present invention.

FIG. 2 is a diagram for illustrating, in the form of a graph, an example of the laminate configuration information 22 to be calculated in the laminate configuration information calculation step of the method of designing a composite material laminated structure according to this embodiment. The axis of abscissa represents the fiber orientation angle (in degrees) and the axis of ordinate represents the number of layers required to be laminated. As shown in FIG. 2, the laminate configuration information 22 calculated in the laminate configuration information calculation step includes information about the number of layers required to be laminated that is set for each fiber orientation angle.

Depending on what algorithm is used in the laminate configuration information calculation step, the number of layers required to be laminated that is set for each fiber orientation angle may not be an integer equal to or larger than 0 (hereinafter referred to as "non-negative integer"). The laminate configuration information calculation step may therefore be followed by execution of a discretization step in which the number of layers required to be laminated is turned into a non-negative integer. The discretization step is described later.

The composite material laminated structure is designed through the steps described above, to thereby facilitate determination of a theoretical laminate configuration with which a desired physical property value is reached. The efficiency of designing a composite material laminated structure can accordingly be improved.

Figure 3:
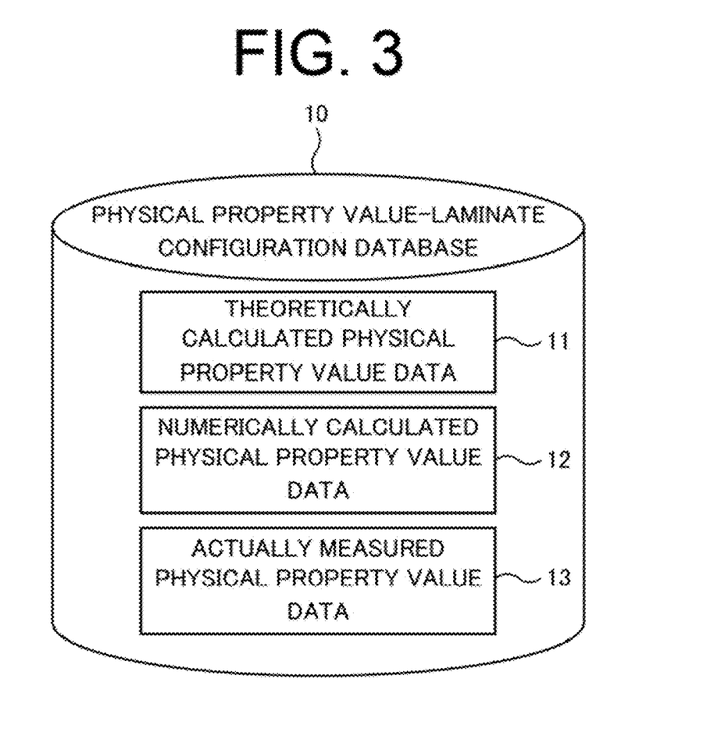
FIG. 3 is a conceptual diagram for illustrating a configuration of a physical property value-laminate configuration database to be used in the method of designing a composite material laminated structure according to the first embodiment of the present invention.

FIG. 3 is a conceptual diagram for illustrating a configuration of the physical property value-laminate configuration database 10 to be used in the method of designing a composite material laminated structure according to this embodiment. As illustrated in FIG. 3, at least one type out of theoretically calculated physical property value data 11, numerically calculated physical property value data 12, and actually measured physical property value data 13 is stored in the physical property value-laminate configuration database 10 as physical property value data associated with laminate configuration data in each of a plurality of pieces of data.

The theoretically calculated physical property value data 11 is data obtained by theoretical calculation based on the laminate configuration of the composite material laminated structure. The theoretically calculated physical property value data 11 is created in a data creation step of Classical Lamination Theory (CLT), for example. The numerically calculated physical property value data 12 is data obtained by numerical calculation based on the laminate configuration of the composite material laminated structure. The numerically calculated physical property value data 12 is created in a data creation step of Finite Element Analysis (FEA), for example. The actually measured physical property value data 13 is data obtained by actual measurement of the physical property value of the composite material laminated structure.

One pair of pieces of data in the physical property value-laminate configuration database 10 includes data of a laminate configuration and data out of the theoretically calculated physical property value data 11, the numerically calculated physical property value data 12, and the actually measured physical property value data 13 that is associated with this laminate configuration. A hundred or more pairs of pieces of data are desirably stored in the physical property value-laminate configuration database 10.

Figure 4:
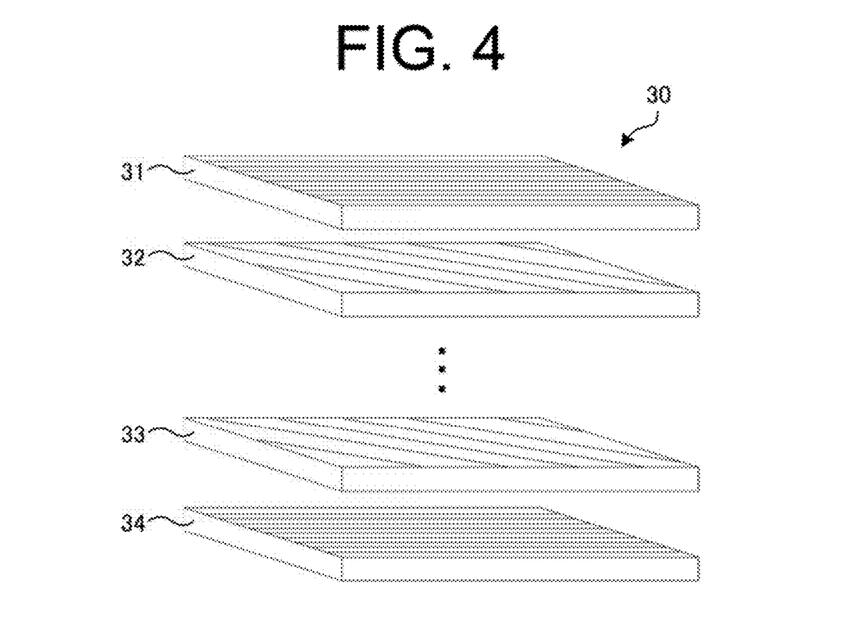
FIG. 4 is a schematic diagram for illustrating a configuration of a composite material laminated structure that is manufactured with the use of the method of designing a composite material laminated structure according to the first embodiment of the present invention.

An example of calculation results obtained by the method of designing a composite material laminated structure according to this embodiment is described. FIG. 4 is a schematic diagram for illustrating a configuration of a composite material laminated structure 30 which is manufactured with the use of the method of designing a composite material laminated structure according to this embodiment. The composite material laminated structure 30 illustrated in FIG. 4 has a shape of a flat board. The composite material laminated structure 30 has a configuration in which a plurality of layers including a first layer 31, a second layer 32, a third layer 33, and a fourth layer 34 are layered. The first layer 31 and the second layer 32 are adjacent to each other, and the third layer 33 and the fourth layer 34 are adjacent to each other. Each of the plurality of layers are formed from one type of material out of two material types. The plurality of layers each have, in an in-plane direction, a fiber orientation angle that is any multiple of 5° from 0° to 90°.

In this embodiment, the two material types, a physical property value of the composite material laminated structure 30, the total number of layers to be laminated in the composite material laminated structure 30, an output format of a laminate configuration, and the like are selectable as design conditions of the composite material laminated structure 30. As the two material types, a carbon fiber-reinforced plastic composite material containing a pitch-based fiber YS95A (a product of Nippon Graphite Fiber Co., Ltd.) and an epoxy resin, and a CFRP containing a PAN-based fiber T800H (a product of TORAY INDUSTRIES, INC.) and an epoxy resin were selected. As a physical property value of the composite material laminated structure 30, the elastic modulus in a longitudinal direction and the thermal expansion rate in the longitudinal direction were selected. As the total number of layers to be laminated in the composite material laminated structure 30, 18 was selected. As an output format of the laminate configuration, the number of layers required to be laminated that is set for each material type and the number of layers required to be laminated that is set for each fiber orientation angle were selected.

The following processing was executed by executing, with the processor, the program stored in the storage device. First, as a data creation step prior to machine learning, 200 pieces of data of laminate configurations in which the material type of each layer and the fiber orientation angle of each layer were selected at random were created. Next, the elastic modulus in the longitudinal direction and the thermal expansion rate in the longitudinal direction were calculated for each of the laminate configurations with the use of CLT. This yielded 200 pairs of pieces of data each including a pair of a physical property value and a laminate configuration. The physical property value in each pair of pieces of data has two elements that are the elastic modulus in the longitudinal direction of the laminate configuration and the thermal expansion rate in the longitudinal direction of the laminate configuration. The obtained 200 pairs of pieces of data were stored in the physical property value-laminate configuration database 10.

When the number of material types, the increment of the fiber orientation angle, and the total number of layers to be laminated are set as described above, the total number of possible laminate configurations is $10^{14}$ or more. It is therefore not practical to calculate a physical property value for every one of the laminate configurations and, from the result of the calculation, determine a laminate configuration with which a desired physical property value is reached. The number of pieces of data created in this embodiment is very small compared to the total number of possible laminate configurations.

Next, 170 pairs of pieces of data were extracted at random from the 200 pairs of pieces of data in the physical property value-laminate configuration database 10. The machine learning step using linear regression analysis was executed next. In the machine learning step, machine learning of the 170 pairs of pieces of data was performed so that, when a physical property value was input, the numbers of layers required to be laminated that were set for each material type and for each fiber orientation angle and were selected as the output format of a laminate configuration were output. The relational expression 20 depicting a relationship between a physical property value and a laminate configuration was thus obtained in the machine learning step.

In order to investigate the appropriateness of the relational expression 20 obtained in the machine learning step, physical property values of all 200 pairs of pieces of data including the 30 pairs that were not used in the machine learning step were input to the relational expression 20, and 200 pieces of laminate configuration information 22 were consequently output. A physical property value was calculated with the use of CLT for each of the 200 output pieces of laminate configuration information 22.

Figure 5:
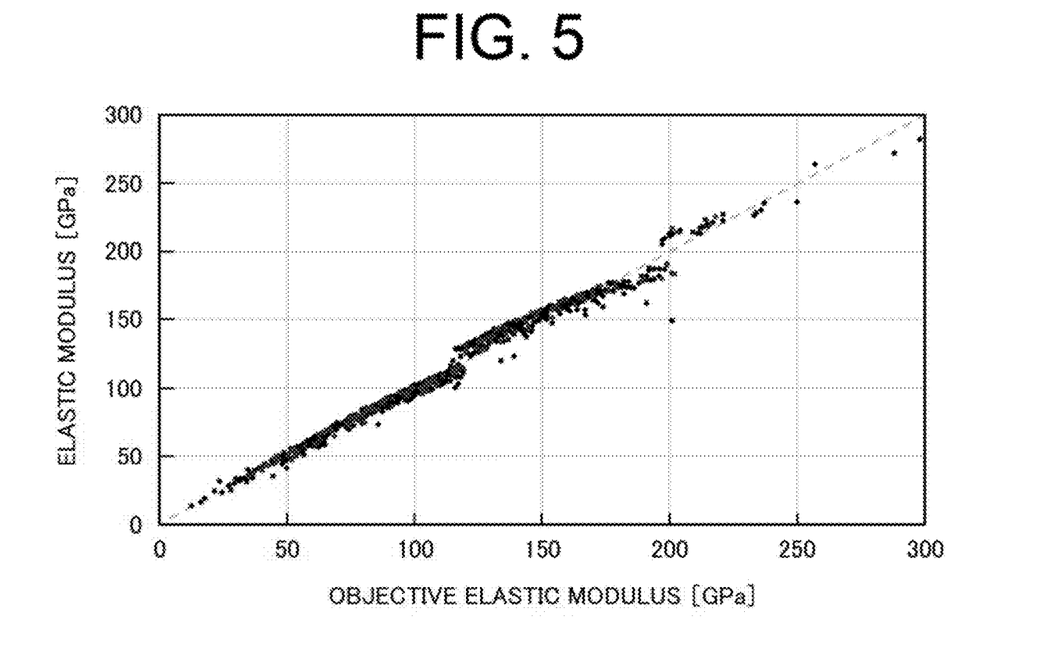
FIG. 5 is a graph for showing a relationship between a physical property value of each piece of data and a physical property value that is calculated with the use of CLT from the laminate configuration information obtained by inputting the physical property value of the piece of data to a relational expression.
Figure 6:
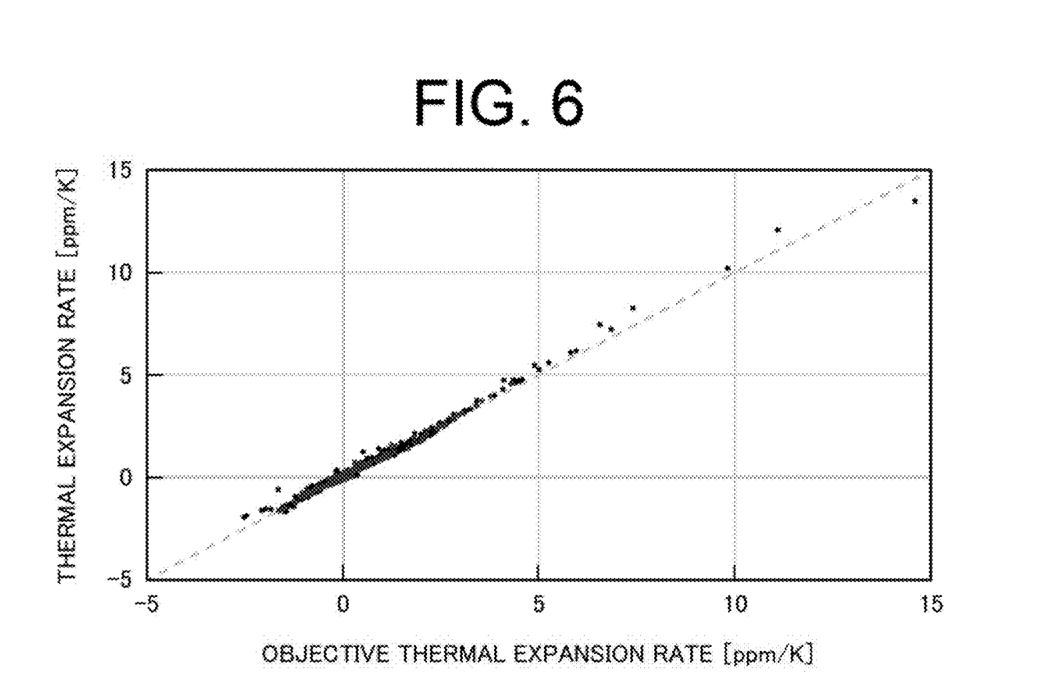
FIG. 6 is a graph for showing a relationship between a physical property value of each piece of data and a physical property value that is calculated with the use of CLT from the laminate configuration information obtained by inputting the physical property value of the piece of data to a relational expression.

FIG. 5 and FIG. 6 are each a graph for showing a relationship between a physical property value of each piece of data and a physical property value that is calculated with the use of CLT from the laminate configuration information 22 obtained by inputting the physical property value of the piece of data to the relational expression 20. The graph of FIG. 5 uses the elastic modulus in the longitudinal direction as a physical property value. On the axis of abscissa of FIG. 5, the elastic modulus in the longitudinal direction in each piece of data is shown as an objective elastic modulus (in units of GPa). The axis of ordinate of FIG. 5 represents an elastic modulus (in units of GPa) in the longitudinal direction that is calculated with the use of CLT from the laminate configuration information 22 obtained by inputting the objective elastic modulus to the relational expression 20.

The graph of FIG. 6 uses the thermal expansion rate in the longitudinal direction as a physical property value. On the axis of abscissa of FIG. 6, the thermal expansion rate in the longitudinal direction in each piece of data is shown as an objective thermal expansion rate (in units of ppm/K). The axis of ordinate of FIG. 6 represents a thermal expansion rate (in units of ppm/K) in the longitudinal direction that is calculated with the use of CLT from the laminate configuration information 22 obtained by inputting the objective thermal expansion rate to the relational expression 20.

In the graph of FIG. 5, a coefficient of correlation between the objective elastic modulus on the axis of abscissa and the elastic modulus on the axis of ordinate was approximately 99.5%. In the graph of FIG. 6, a coefficient of correlation between the objective thermal expansion rate on the axis of abscissa and the thermal expansion rate on the axis of ordinate was approximately 99.5% as well. The appropriateness of the relational expression 20 obtained in the machine learning step was thus confirmed. It is therefore understood that, according to this embodiment, a laminate configuration of the composite material laminated structure 30 can easily be designed by using the relational expression 20 obtained in the machine learning step.

The elastic modulus in the longitudinal direction and the thermal expansion rate in the longitudinal direction are used as a physical property value of the composite material laminated structure 30 in this embodiment, but the physical property value is not limited thereto. For a physical property value of the composite material laminated structure 30, at least one of the physical property values out of the longitudinal elastic modulus, the transverse elastic modulus, the Poisson ratio, the thermal expansion rate, the magnitude of residual deformation in shape forming, and the like can be used. A physical property value in at least one direction out of, for example, three directions in total that are two directions orthogonal to each other in a lamination plane of the composite material laminated structure 30 and a board thickness direction of the composite material laminated structure 30 can also be used as a physical property value of the composite material laminated structure 30.

Figure 7:
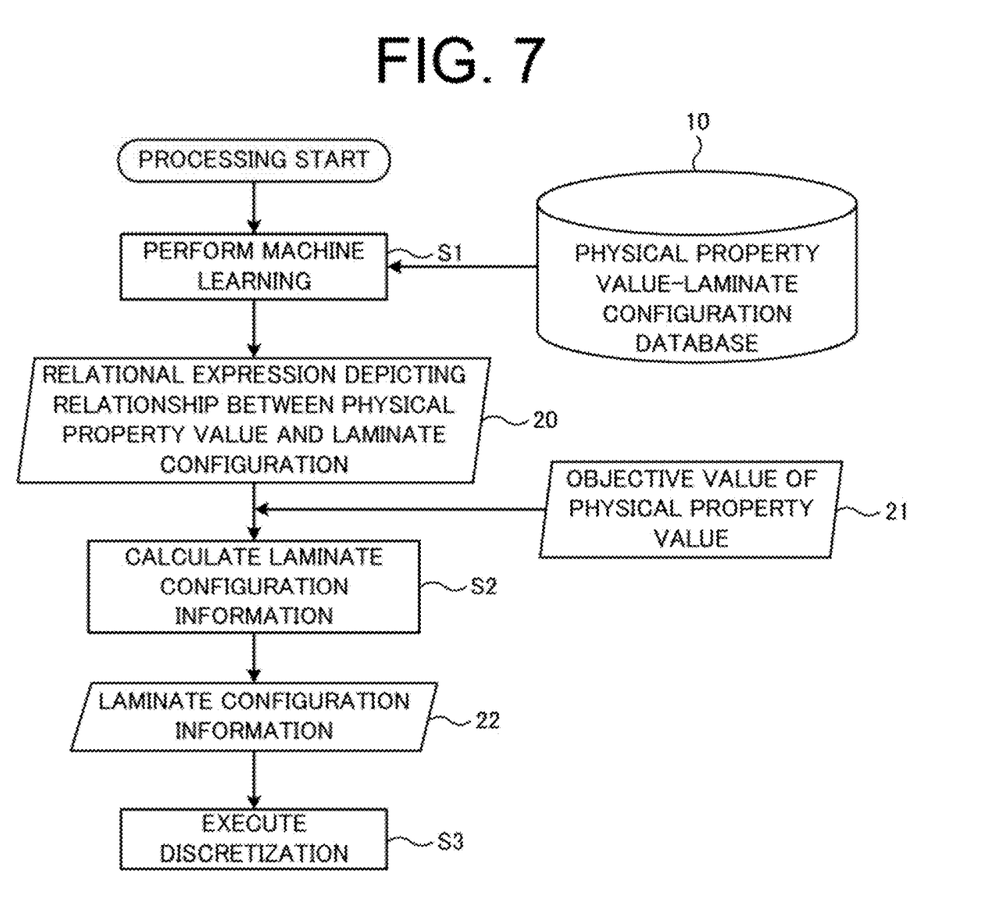
FIG. 7 is a flow chart for illustrating a flow of processing of a method of designing a composite material laminated structure according to a modification example of the first embodiment of the present invention.

FIG. 7 is a flow chart for illustrating a flow of processing of a method of designing the composite material laminated structure 30 according to a modification example of this embodiment. In the processing flow illustrated in FIG. 7, a discretization step (Step S3) in which the number of layers required to be laminated that is set for each fiber orientation angle is corrected to a non-negative integer by discretization is executed after the laminate configuration information calculation step. As shown in FIG. 2, the number of layers required to be laminated that is set for each fiber orientation angle is not a non-negative integer in some cases. In actual manufacture of the composite material laminated structure 30, on the other hand, the number of layers required to be laminated that is set for each fiber orientation angle is required to be a non-negative integer for every fiber orientation angle. The method may therefore be configured so that the discretization step is executed after the laminate configuration information calculation step as required.

In the discretization step, the numbers of layers required to be laminated at all fiber orientation angles are divided into a plurality of sections first so that the sum of the numbers of layers required to be laminated in each section is 1. A weighted average of the fiber orientation angles in each section is then set as a representative fiber orientation angle of the section. The number of layers required to be laminated that is set for each fiber orientation angle can be turned into a non-negative integer in this manner. Specifically, when the fiber orientation angle is represented by "x" and the number of layers required to be laminated at the fiber orientation angle "x" is expressed by f(x), "yi" satisfying Expression (1) is set as the representative fiber orientation angle.

$$y_i = \int_{x_i}^{x_{i+1}} x \cdot f(x) dx \quad (1)$$

In Expression (1), "xi" represents a fiber orientation angle that satisfies Expression (2), represents a non-negative integer, and "x0" is 0°.

$$\int_{x_i}^{x_{i+1}} f(x) dx = 1 \quad (2)$$

Two types of materials are used in layers of the composite material laminated structure in this embodiment, but the number of types of materials to be used may be one, or three or more.

In this embodiment, the total number of layers laminated in the composite material laminated structure 30 is desirably ten or more.

In this embodiment, the laminate configuration information may include information about an order in which the plurality of layers are laminated. In this case, a constraint condition based on a manufacturing condition of the composite material laminated structure 30 may be set in the laminate configuration information calculation step. A condition about a fiber orientation angle difference, for example, may be set as the constraint condition. The fiber orientation angle difference is a difference between fiber orientation angles of two adjacent layers that is expressed by an angle equal to or more than 0° and equal to or less than 90°. Data of the fiber orientation angle difference can be incorporated in the machine learning step by enabling selection of the data of the fiber orientation angle difference as a part of the physical property value. The fiber orientation angle difference is better when the fiber orientation angle difference is smaller, and a preferred fiber orientation angle difference is 45° or less. For instance, in the composite material laminated structure 30 illustrated in FIG. 4, the fiber orientation angle difference between the first layer 31 and the second layer 32 which are adjacent to each other and the fiber orientation angle difference between the third layer 33 and the fourth layer 34 which are adjacent to each other are both preferred to be 45° or less. With the fiber orientation angle difference limited to 45° or less, residual stress caused in manufacture of the composite material laminated structure 30 can be reduced. As another constraint condition, the proportion of a type of material to the whole composite material laminated structure 30 or the like may be set.

The increment of the fiber orientation angle is 5° in this embodiment, but may be smaller than 5° or larger than 5°.

In this embodiment, the number of layers required to be laminated that is set for each fiber orientation angle is selected as the output format of a laminate configuration, but an angle of lamination of layers or a thickness of the laminated layers may be selected as the output format of a laminate configuration.

This embodiment takes the composite material laminated structure 30 that has the shape of a flat board as an example. However, the composite material laminated structure 30 may be given a shape that is circular, polygonal, or the like in closed cross-section, or a shape that has an open cross-section. When the composite material laminated structure 30 is given a shape that has a closed cross-section, selection of the inner diameter and outer diameter of the composite material laminated structure 30, the number of vertices in the cross-section, and similar data as a part of the physical value or a part of the laminate configuration may be enabled. Those pieces of data can be incorporated in the machine learning step in this manner. The composite material laminated structure 30 may also be given a shape having corner portions that is the shape of a letter L in cross-section, the shape of a letter U in cross-section, or the like. In this case, selection of data about a curvature, a flange length, and the like in the corner portions as a part of the physical property value or a part of the laminate configuration may be enabled, to thereby incorporate those pieces of data in the machine learning step.

This embodiment takes composite materials containing carbon fibers and epoxy resins as an example of materials of the composite material laminated structure 30, but the materials of the composite material laminated structure 30 are not limited thereto. As the material of the composite material laminated structure 30, a fiber other than carbon fiber, such as glass fiber or ceramic fiber, may be used, and a resin other than the epoxy resin, such as a cyanate ester resin, an unsaturated polyester resin, a polyether ether ketone resin, a thermoplastic polyimide resin, or a polyphenylene sulfide resin, may also be used.

This embodiment takes FRP as an example of a material of the composite material laminated structure 30. However, aluminum, iron, and other types of metal, as well as epoxy, cyanate, and other types of resin, may also be used as materials of the composite material laminated structure 30. That is, data about materials other than FRP may be stored in the physical property value-laminate configuration database 10.

Linear regression analysis is used as an algorithm of the machine learning step in this embodiment, but an algorithm other than linear regression analysis is usable for the machine learning step as long as a relational expression depicting a relationship between a physical property value and a laminate configuration can be obtained. For example, an algorithm utilizing a neural network or Bayesian regression may be used for the machine learning step.

In this embodiment, when an objective value of a physical property value cannot be reached with a laminate configuration that is selected as a setting condition, the laminate configuration may be modified based on the relational expression 20 depicting a relationship between the physical property value and the laminate configuration.

As described above, the method of designing a composite material laminated structure according to this embodiment includes: the machine learning step (Step S1 of FIG. 1) of performing machine learning on a plurality of pieces of data each of which includes a pair of a physical property value of the composite material laminated structure 30 and a laminate configuration of the composite material laminated structure 30, to obtain the relational expression 20 depicting a relationship between the physical property value and the laminate configuration, the composite material laminated structure including a plurality of layers that are laminated; and the laminate configuration information calculation step (Step S2 of FIG. 1) of calculating, based on the relational expression 20 and the objective value 21 of the physical property value, the laminate configuration information 22 which is information of the laminate configuration that enables the objective value 21 to be obtained.

According to this configuration, the relational expression 20 depicting a relationship between a physical property value of the composite material laminated structure 30 and a laminate configuration of the composite material laminated structure 30 can be obtained by machine learning and, accordingly, a user can semi-automatically obtain the relational expression 20. The laminate configuration information 22 of a laminate configuration with which the objective value 21 of the physical property value is reached can therefore be calculated with ease even when the relational expression 20 depicting a relationship between the physical property value and the laminate configuration is not obtained in advance. The configuration described above can accordingly reduce the arduousness of designing a laminate configuration of the composite material laminated structure 30. As a result, a laminate configuration of the composite material laminated structure 30 that has a desired physical property value can easily be designed.

According to the configuration described above, the laminate configuration information 22 can be calculated based on the relational expression 20 without calculating a physical property value for every possible laminate configuration of the composite material laminated structure 30, because the relational expression 20 can be obtained by machine learning. The configuration described above can accordingly shorten the time spent on designing a laminate configuration of the composite material laminated structure 30. As a result, a laminate configuration of the composite material laminated structure 30 that has a desired physical property value can efficiently be designed based on fewer pieces of data.

In the method of designing a composite material laminated structure according to this embodiment, the plurality of layers each have a fiber oriented at a certain fiber orientation angle. The laminate configuration information 22 includes information about the number of layers required to be laminated that is set for each fiber orientation angle. According to this configuration, information about the number of layers required to be laminated that is set for each fiber orientation angle can be figured out from the laminate configuration information 22.

In the method of designing a composite material laminated structure according to this embodiment, the laminate configuration information 22 includes information about an order in which the plurality of layers are laminated. In the laminate configuration information calculation step, the laminate configuration information 22 is generated so that a fiber orientation angle difference between two adjacent layers out of the plurality of layers is 45° or less. According to this configuration, the fiber orientation angle difference between two adjacent layers can be set to 45° or less, and residual stress caused in the manufacture of the composite material laminated structure 30 can therefore be reduced.

The method of designing a composite material laminated structure according to this embodiment further includes the discretization step (Step S3 of FIG. 7) of executing discretization to turn the number of layers required to be laminated that is set for each fiber orientation angle into a non-negative integer. According to this configuration, the information about the number of layers required to be laminated that is set for each fiber orientation angle and that is obtained in the laminate configuration information calculation step can be modified to information about the number of layers that is implementable in the manufacture of the composite material laminated structure 30.

In the method of designing a composite material laminated structure according to this embodiment, in the discretization step, the number of layers required to be laminated at each fiber orientation angle may be divided into one of a plurality of sections so that a sum of the numbers of layers required to be laminated in each section is 1, and a weighted average of the fiber orientation angles in each of the plurality of sections may be set as a representative fiber orientation angle of the each of the plurality of the sections.

In the method of designing a composite material laminated structure according to this embodiment, the physical property value includes at least two physical property values out of a longitudinal elastic modulus, a transverse elastic modulus, a Poisson ratio, and a thermal expansion rate. According to this configuration, the laminate configuration information 22 about a laminate configuration with which the objective value 21 of each of the plurality of elements of the physical property value is reached at the same time can be calculated at once. The arduousness of designing a laminate configuration of the composite material laminated structure 30 can accordingly be reduced even more.

In the method of designing a composite material laminated structure according to this embodiment, the physical property value of each of the plurality of pieces of data is obtained by at least one of theoretical calculation, numerical calculation, and actual measurement. In the theoretical calculation, a large number of pieces of physical property value data can be obtained, although the shape of the composite material laminated structure 30 is limited. The numerical calculation can yield physical property value data that takes the shape of the composite material laminated structure 30 into consideration and that is accordingly even higher in precision than data obtained by theoretical calculation. The actual measurement can yield physical property value data reflecting factors that cannot be taken into account in calculation. The use of the plurality of types of physical property value data described above increases the number of pieces of data, and the relational expression 20 that has a high degree of certainty and few errors can accordingly be obtained.

In the method of designing a composite material laminated structure according to this embodiment, the plurality of layers include two or more layers different from one another in material. According to this configuration, the laminate configuration information 22 can be calculated without calculating a physical property value for every possible laminate configuration, even for the complicate composite material laminated structure 30 which includes two or more layers different from one another in material, because the relational expression 20 can be obtained by machine learning. The configuration described above can accordingly shorten the time spent on designing a laminate configuration of the composite material laminated structure 30.

In the method of designing a composite material laminated structure according to this embodiment, the number of layers that are laminated for the composite material laminated structure 30 is ten or more. When the composite material laminated structure 30 has a large number of laminated layers, the number of possible laminate configurations is very large. When the composite material laminated structure 30 has ten or more laminated layers, the material of each of the layers is selected from two material types, and the increment of the fiber orientation angle is 5°, the number of possible laminate configurations is $5.1 \times 10^9$. According to the configuration described above, the laminate configuration information 22 can be calculated without calculating a physical property value for every possible laminate configuration, even when the number of laminated layers is ten or more, because the relational expression 20 can be obtained by machine learning. The configuration described above can accordingly shorten the time spent on designing a laminate configuration of the composite material laminated structure 30.

Second Embodiment

Figure 8:
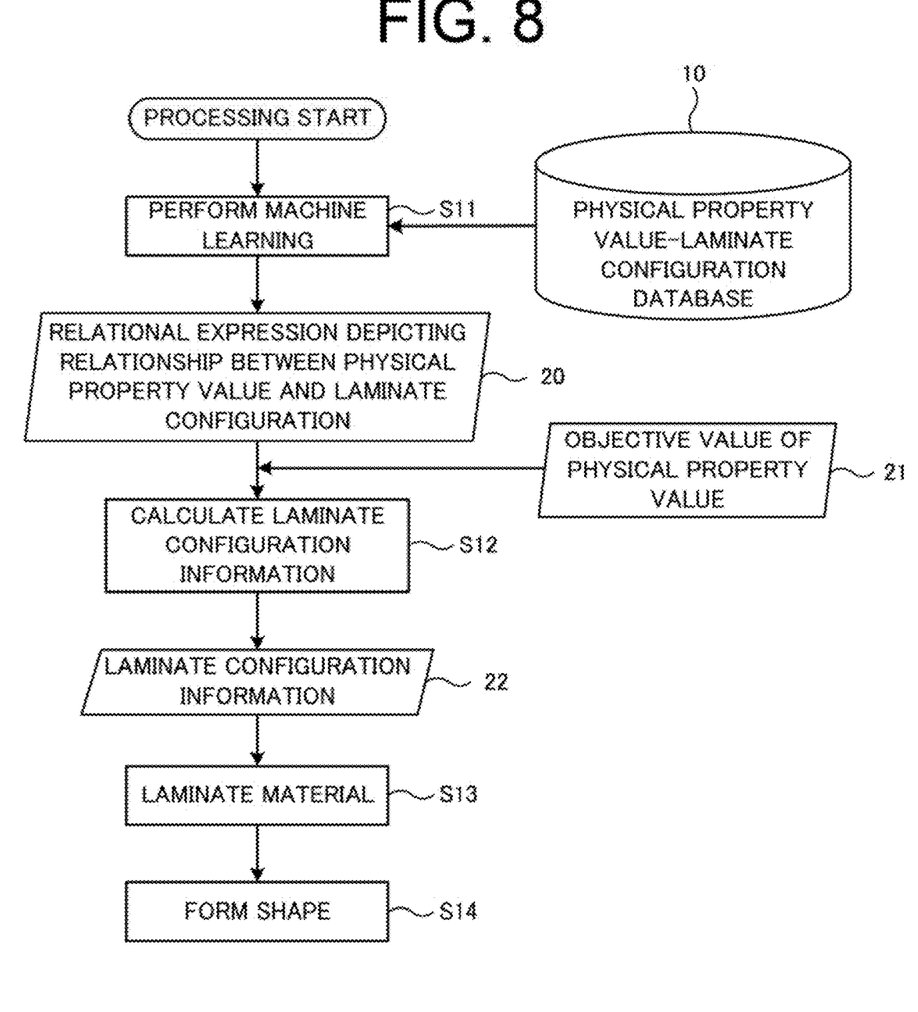
FIG. 8 is a flow chart for illustrating a flow of processing, or a flow of steps, of a method of manufacturing a composite material laminated structure according to a second embodiment of the present invention.

A method of manufacturing a composite material laminated structure according to a second embodiment of the present invention is described. The method of manufacturing a composite material laminated structure according to this embodiment includes the method of designing a composite material laminated structure according to the first embodiment. FIG. 8 is a flow chart for illustrating a flow of processing, or a flow of steps, of the method of manufacturing a composite material laminated structure according to this embodiment. As illustrated in FIG. 8, the method of manufacturing a composite material laminated structure according to this embodiment includes a machine learning step (Step S11), a laminate configuration information calculation step (Step S12), a material laminating step (Step S13), and a shape forming step (Step S14). The machine learning step and the laminate configuration information calculation step are the same as those in the method of deigning a composite material laminated structure according to the first embodiment, and description thereof is therefore omitted.

The material laminating step of Step S13 is a step of laminating an intermediate material based on the laminate configuration information 22 which is output in the laminate configuration information calculation step. Although not illustrated in FIG. 8, a discretization step in which the number of layers required to be laminated that is set for each fiber orientation angle is turned into a non-negative integer may be executed before the material laminating step. In the material laminating step, a plurality of prepreg sheets, for example, are formed on a jig based on the laminate configuration information 22. Prepreg is a sheet-shaped intermediate material fabricated by impregnating a reinforcement fiber with resin. A plurality of prepreg sheets laid on top of one another is referred to as "prepreg laminate".

The shape forming step of Step S14 is a step of integrating the intermediate material layered in the material laminating step. In the shape forming step, the prepreg laminate is integrated by curing the resin contained in the prepreg laminate, or by melting the resin contained in the prepreg laminate once and then curing the resin. The composite material laminated structure 30 is manufactured in this manner.

Figure 9:
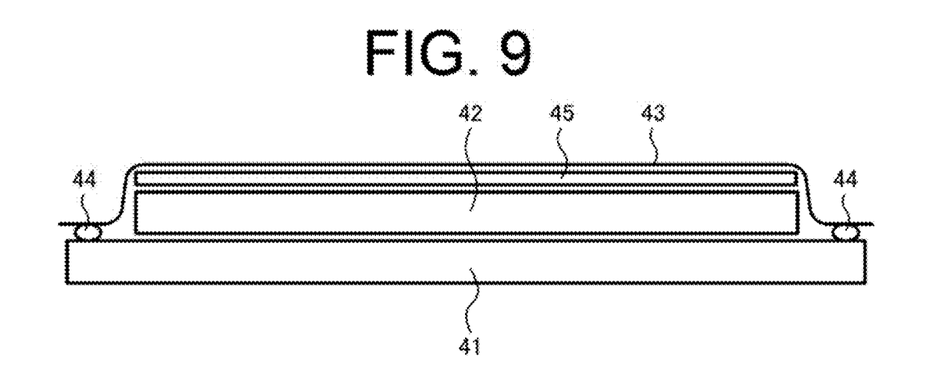
FIG. 9 is a schematic diagram for illustrating a shape forming step of the method of manufacturing a composite material laminated structure according to the second embodiment of the present invention.

FIG. 9 is a schematic diagram for illustrating the shape forming step of the method of manufacturing a composite material laminated structure according to this embodiment. In this example, a thermally curable resin is used as the resin contained in the prepreg. As illustrated in FIG. 9, in the form shaping step, a prepreg laminate 42 is sealed first on a jig 41 with the use of a bagging film 43 and a sealant 44. A sub-material 45 which is a member configured to secure a path for a gaseous body may be provided as required inside the bagging film 43. Next, the jig 41 and the sealed prepreg laminate 42 are set in an autoclave apparatus. The autoclave apparatus heats the prepreg laminate 42 under pressure applied from outside the bagging film 43, with air in the bagging film 43 being exhausted by an exhaust pump. For example, a state in which a pressurization pressure inside the autoclave apparatus is set to an atmospheric pressure of 3 and a heating temperature is set to 120° C. is maintained for 3 hours. This solidifies the prepreg laminate 42 in an integrated manner, to thereby form the shape of the composite material laminated structure 30. A pressurization condition and a heating condition that are suitable for the resin contained in the prepreg are set. After the pressurization and the heating are finished, the interior of the autoclave apparatus is cooled down to room temperature, and the jig 41 and the composite material laminated structure 30 are then taken out of the autoclave apparatus. The composite material laminated structure 30 is obtained by removing the jig 41, the bagging film 43, and the sub-material 45 from the composite material laminated structure 30.

In this embodiment, a thermally curable resin is used as the resin contained in the prepreg, but the resin contained in the prepreg may be a thermoplastic resin.

This embodiment takes an autoclaving method using a prepreg as an example of the method of manufacturing the composite material laminated structure 30, but other methods, for example, resin transfer molding (RTM) and filament winding, are also employable.

As described above, the method of manufacturing a composite material laminated structure according to this embodiment includes the method of designing a composite material laminated structure according to the first embodiment. The method of manufacturing a composite material laminated structure according to this embodiment further includes: the material laminating step (Step S13 of FIG. 8) of laminating an intermediate material based on the laminate configuration information 22; and the shape forming step (Step S14 of FIG. 8) of forming a shape of the composite material laminated structure 30 by integrating the intermediate material.

According to this configuration, the arduousness of designing a laminate configuration of the composite material laminated structure 30 can be reduced, and the composite material laminated structure 30 that has a desired physical property value can be manufactured with an improved efficiency.

Third Embodiment

A designing device for a composite material laminated structure according to a third embodiment of the present invention is described. The designing device for a composite material laminated structure according to this embodiment is used when the method of designing a composite material laminated structure according to the first embodiment, or the method of manufacturing a composite material laminated structure according to the second embodiment, is executed. A computer including a processor, a storage device, an input/output interface circuit, and others is used as the designing device for a composite material laminated structure according to this embodiment.

Figure 10:
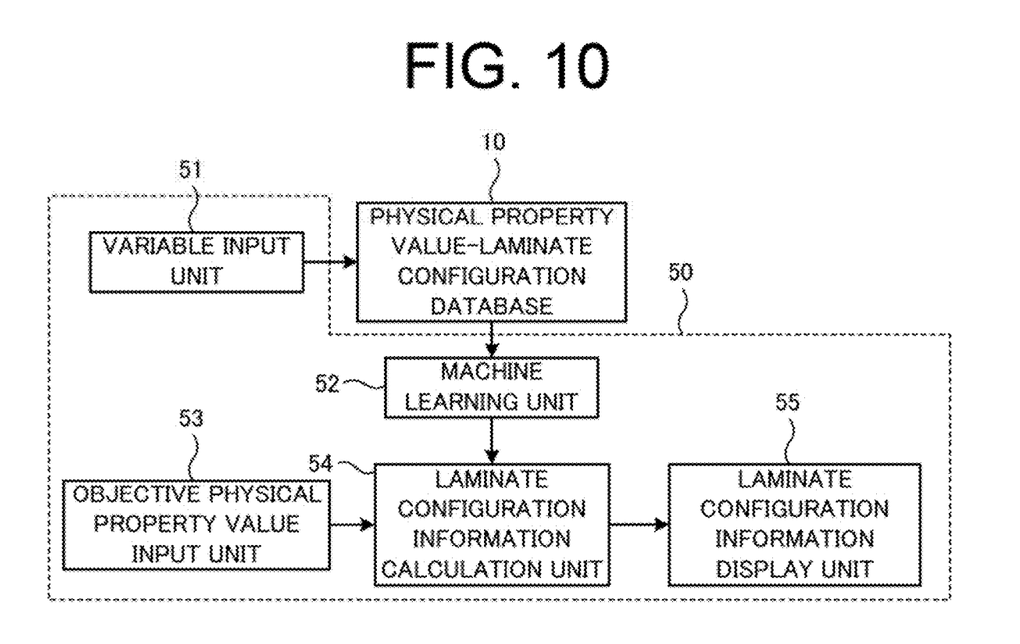
FIG. 10 is a block diagram for illustrating a configuration of a designing device for a composite material laminated structure according to a third embodiment of the present invention.

FIG. 10 is a block diagram for illustrating a configuration of a designing device 50 for a composite material laminated structure according to this embodiment. As illustrated in FIG. 10, the designing device 50 includes a variable input unit 51, a machine learning unit 52, an objective physical property value input unit 53, a laminate configuration information calculation unit 54, and a laminate configuration information display unit 55.

The variable input unit 51 is an input unit through which a plurality of pieces of data are each input as a variable. Each of the plurality of pieces of data includes a pair of a physical property value of the composite material laminated structure 30 and a laminate configuration of the composite material laminated structure 30. A keyboard, for example, is used as the variable input unit 51.

The variable input through the variable input unit is stored in the physical property value-laminate configuration database 10. The physical property value-laminate configuration database 10 is built in this manner. The physical property value-laminate configuration database 10 may be included in the designing device 50. In the physical property value-laminate configuration database 10, at least one type of data out of the theoretically calculated physical property value data 11, the numerically calculated physical property value data 12, and the actually measured physical property value data 13 is stored as physical property value data associated with laminate configuration data. A physical property value and a laminate configuration that are pieces of data forming a pair in the physical property value-laminate configuration database 10 can each have a plurality of elements. The longitudinal elastic modulus, the transverse elastic modulus, the Poisson ratio, and the thermal expansion rate, for example, are included in elements of the physical property value. The number of layers required to be laminated that is set for each fiber orientation angle, for example, is included in elements of the laminate configuration.

The machine learning unit 52 is a function block implemented by the processor by executing a program that is stored in the storage device, and corresponds to, for example, Step S1 of FIG. 1. The machine learning unit 52 is configured to perform machine learning on variables stored in the physical property value-laminate configuration database 10, to thereby obtain the relational expression 20 depicting a relationship between a physical property value and a laminate configuration. The relational expression 20 is an expression to which a physical property value is input and from which a laminate configuration is output in response to the input.

The objective physical property value input unit 53 is an input unit through which the objective value 21 of a physical property value is input. For example, the keyboard shared with the variable input unit 51 is used as the objective physical property value input unit 53.

The laminate configuration information calculation unit 54 is a function block implemented by the processor by executing the program that is stored in the storage device, and corresponds to, for example, Step S2 of FIG. 1. The laminate configuration information calculation unit 54 is configured to calculate, based on the relational expression 20 obtained by the machine learning unit 52 and on the objective value 21 input through the objective physical property value input unit 53, the laminate configuration information 22 which is information of a theoretical laminate configuration that enables the objective value 21 to be obtained.

The laminate configuration information display unit is a display unit configured to display the laminate configuration information 22 calculated by the laminate configuration information calculation unit 54. A monitor, for example, is used as the laminate configuration information display unit 55.

Figure 11:
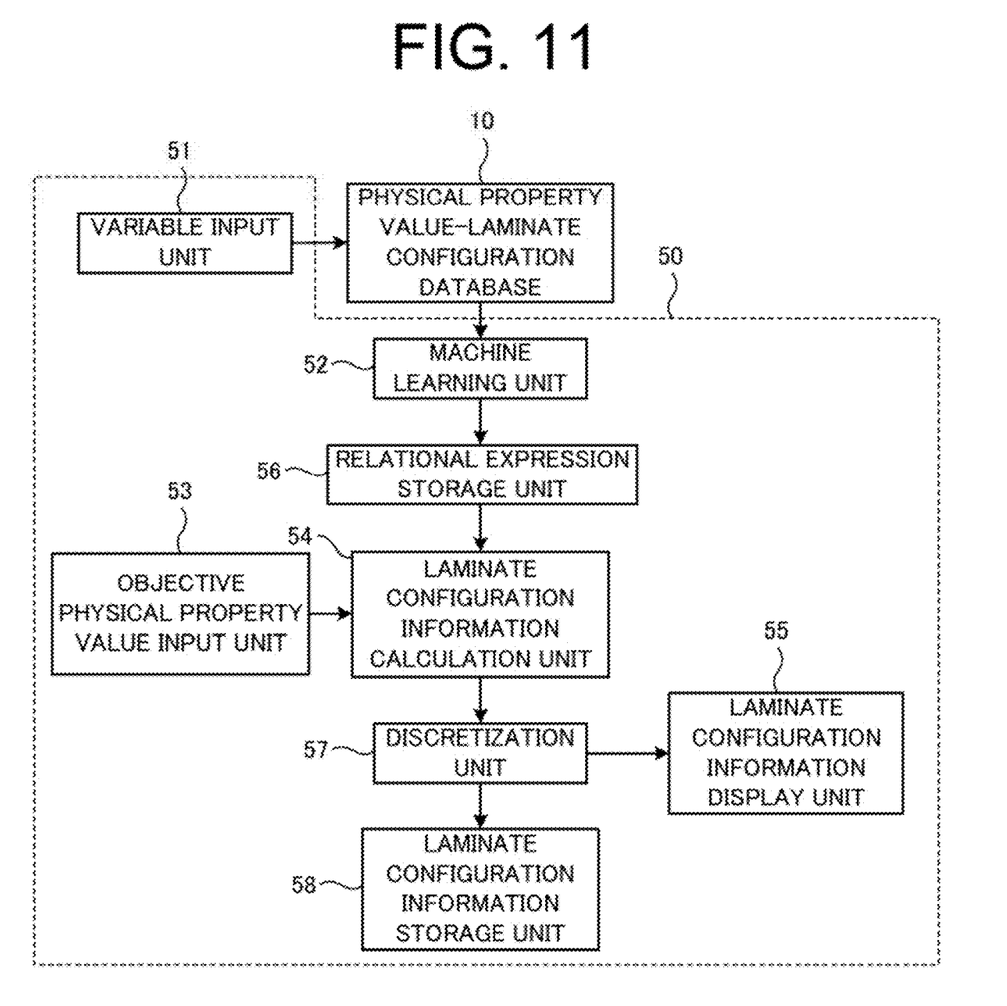
FIG. 11 is a block diagram for illustrating a configuration of a designing device for a composite material laminated structure according to a modification example of the third embodiment of the present invention.

FIG. 11 is a block diagram for illustrating a configuration of the designing device 50 for a composite material laminated structure according to a modification example of this embodiment. The designing device 50 of this modification example illustrated in FIG. 11 includes, in addition to the configuration of the designing device 50 that is illustrated in FIG. 10, a discretization unit 57, a relational expression storage unit 56, and a laminate configuration information storage unit 58. The discretization unit 57, the relational expression storage unit 56, and the laminate configuration information storage unit 58 are each provided as required.

The discretization unit 57 is a function block implemented by the processor by executing the program that is stored in the storage device, and corresponds to, for example, Step S3 of FIG. 7. The discretization unit 57 is configured to correct the number of layers required to be laminated that is set for each fiber orientation angle and that is calculated by the laminate configuration information calculation unit 54 to a non-negative integer by discretization. The laminate configuration information display unit 55 displays the laminate configuration information 22 corrected by the discretization unit 57.

The relational expression storage unit 56 is configured to store the relational expression 20 obtained through machine learning by the machine learning unit 52. This enables the laminate configuration information calculation unit 54 to calculate the laminate configuration information 22 based on the relational expression 20 which is stored in the relational expression storage unit 56 and on the objective value 21 which is input through the objective physical property value input unit 53. The machine learning unit 52 can thus be prevented from repeatedly executing machine learning each time the objective value 21 is input. The relational expression storage unit 56 is configured from, for example, a storage area provided in a part of the storage device of the computer.

The laminate configuration information storage unit 58 is configured to store the laminate configuration information that has been calculated by the laminate configuration information calculation unit 54, or the laminate configuration information 22 that has been corrected by the discretization unit 57. The laminate configuration information storage unit 58 is configured from, for example, a storage area provided in a part of the storage device of the computer.

As described above, the designing device 50 for a composite material laminated structure according to this embodiment includes: the machine learning unit 52 configured to perform machine learning on a plurality of pieces of data each of which includes a pair of a physical property value of the composite material laminated structure 30 and a laminate configuration of the composite material laminated structure 30, to obtain the relational expression 20 depicting a relationship between the physical property value and the laminate configuration, the composite material laminated structure including a plurality of layers that are laminated; and the laminate configuration information calculation unit 54 configured to calculate, based on the relational expression 20 and the objective value 21 of the physical property value, the laminate configuration information 22 which is information of the laminate configuration that enables the objective value 21 to be obtained.

According to this configuration, the relational expression 20 depicting a relationship between a physical property value of the composite material laminated structure 30 and a laminate configuration of the composite material laminated structure 30 can be obtained by machine learning and, accordingly, the user can semi-automatically obtain the relational expression 20. The laminate configuration information 22 can therefore be calculated with ease even when the relational expression 20 depicting a relationship between the physical property value and the laminate configuration is not obtained in advance. The configuration described above can accordingly reduce the arduousness of designing a laminate configuration of the composite material laminated structure 30.

According to the configuration described above, the laminate configuration information 22 can be calculated based on the relational expression 20 without calculating a physical property value for every possible laminate configuration of the composite material laminated structure 30, because the relational expression 20 can be obtained by machine learning. The configuration described above can accordingly shorten the time spent on designing a laminate configuration of the composite material laminated structure 30.

The designing device 50 for a composite material laminated structure according to this embodiment may further include the variable input unit 51 through which each of a plurality of pieces of data is to be input as a variable. The designing device 50 may further include the objective physical property value input unit 53 through which the objective value 21 is to be input. The designing device 50 may further include the laminate configuration information display unit 55 configured to display the laminate configuration information 22.

In the designing device 50 for a composite material laminated structure according to this embodiment, the plurality of layers each have a fiber oriented at a certain fiber orientation angle. The laminate configuration information 22 includes information about the number of layers required to be laminated that is set for each fiber orientation angle. The designing device 50 further includes the discretization unit 57 configured to execute discretization to turn the number of layers required to be laminated that is set for each fiber orientation angle into a non-negative integer. According to this configuration, the information about the number of layers required to be laminated that is set for each fiber orientation angle and that is obtained by the laminate configuration information calculation unit 54 can be modified to information about the number of layers that is implementable in the manufacture of the composite material laminated structure 30.

The designing device 50 for a composite material laminated structure according to this embodiment further includes the relational expression storage unit 56 configured to store the relational expression 20. According to this configuration, the machine learning unit 52 can be prevented from repeatedly executing machine learning each time the objective value 21 is input.

The designing device 50 for a composite material laminated structure according to this embodiment may further include the laminate configuration information storage unit 58 configured to store the laminate configuration information 22.

Further, the first to third embodiments described above and the respective modification examples thereof may be carried out in various combinations.

REFERENCE SIGNS LIST 10 physical property value-laminate configuration database, 11 theoretically calculated physical property value data, 12 numerically calculated physical property value data, 13 actually measured physical property value data, 20 relational expression, 21 objective value, 22 laminate configuration information, 30 composite material laminated structure, 31 first layer, 32 second layer, 33 third layer, 34 fourth layer, 41 jig, 42 prepreg laminate, 43 bagging film, 44 sealant, 45 sub-material, 50 designing device, 51 variable input unit, 52 machine learning unit, 53 objective physical property value input unit, 54 laminate configuration information calculation unit, 55 laminate configuration information display unit, 56 relational expression storage unit, 57 discretization unit, 58 laminate configuration information storage unit

The invention claimed is:

1. A method of designing a composite material laminated structure, comprising:
performing machine learning on a plurality of pieces of data each of which includes a pair of a physical property value of the composite material laminated structure and a laminate configuration of the composite material laminated structure, to obtain a relational expression depicting a relationship between the physical property value and the laminate configuration, the composite material laminated structure including a plurality of layers that are laminated; and
calculating, based on the relational expression and an objective value of the physical property value, laminate configuration information used to obtain the objective value,
wherein the plurality of layers each have a fiber oriented at a certain fiber orientation angle,
wherein the laminate configuration information includes information about a number of layers required to be laminated that is set for each fiber orientation angle,
wherein the method of designing a composite material laminated structure further comprises executing discretization to turn the number of layers required to be laminated that is set for each fiber orientation angle into a non-negative integer, and
wherein the executing discretization includes dividing the number of layers required to be laminated at each fiber orientation angle into one of a plurality of sections so that a sum of the numbers of layers required to be laminated in each section is 1, and setting a weighted average of the fiber orientation angles in each of the plurality of sections as a representative fiber orientation angle of the each of the plurality of the sections.

2. The method of designing a composite material laminated structure according to claim 1,
wherein the laminate configuration information includes information about an order in which the plurality of layers are laminated, and
wherein the calculating includes generating the laminate configuration information so that a fiber orientation angle difference between two adjacent layers out of the plurality of layers is 45° or less.

3. The method of designing a composite material laminated structure according to claim 1, wherein the physical property value includes at least two physical property values out of a longitudinal elastic modulus, a transverse elastic modulus, a Poisson ratio, and a thermal expansion rate.

4. The method of designing a composite material laminated structure according to claim 1, wherein the physical property value of each of the plurality of pieces of data is obtained by at least one of theoretical calculation, numerical calculation, and actual measurement.

5. The method of designing a composite material laminated structure according to claim 1, wherein the plurality of layers include two or more layers different from one another in material.

6. The method of designing a composite material laminated structure according to claim 1, wherein the number of layers that are laminated for the composite material laminated structure is ten or more.

7. A method of manufacturing a composite material laminated structure that includes the method of designing a composite material laminated structure of claim 1, the method of manufacturing a composite material laminated structure further comprising:
laminating an intermediate material based on the laminate configuration information; and
forming a shape of the composite material laminated structure by integrating the intermediate material.

8. A designing device for a composite material laminated structure, comprising:
a processor and storage device including a program for execution by the processor and configured to
perform machine learning on a plurality of pieces of data each of which includes a pair of a physical property value of the composite material laminated structure and a laminate configuration of the composite material laminated structure, to obtain a relational expression depicting a relationship between the physical property value and the laminate configuration, the composite material laminated structure including a plurality of layers that are laminated; and
calculate, based on the relational expression and an objective value of the physical property value, laminate configuration information used to obtain the objective value,
wherein the plurality of layers each have a fiber oriented at a certain fiber orientation angle,
wherein the laminate configuration information includes information about a number of layers required to be laminated that is set for each fiber orientation angle,
wherein the processor is further configured to execute discretization to turn the number of layers required to be laminated that is set for each fiber orientation angle into a non-negative integer, and
wherein the processor is further configured to divide the number of layers required to be laminated at each fiber orientation angle into one of a plurality of sections so that a sum of the numbers of layers required to be laminated in each section is 1, and set a weighted average of the fiber orientation angles in each of the plurality of sections as a representative fiber orientation angle of the each of the plurality of the sections.

9. The designing device for a composite material laminated structure according to claim 8, wherein the processor is further configured to
input each of the plurality of pieces of data as a variable;
input the objective value; and
display the laminate configuration information.

10. The designing device for a composite material laminated structure according to claim 8, further comprising a relational expression storage configured to store the relational expression.

11. The designing device for a composite material laminated structure according to claim 8, further comprising a laminate configuration information storage configured to store the laminate configuration information.

* * * * *